US006142044A

United States Patent [19]

Freund et al.

[11] Patent Number: 6,142,044

[45] Date of Patent: Nov. 7, 2000

[54] SYSTEM FOR TRIMMING EXCESS MATERIAL

[75] Inventors: Joseph M. Freund, Fogelsville; George J. Przybylek, Douglasville; Dennis M. Romero, Bethlehem; Raymond F. Gruszka, Reading, all of Pa.

[73] Assignee: Lucent Technologies, Inc., Murray Hill, N.J.

[21] Appl. No.: 09/389,239

[22] Filed: Sep. 3, 1999

[51] Int. Cl.[7] ................................ B23B 1/00; B23B 5/14

[52] U.S. Cl. .................................. 82/1.11; 82/46; 82/47; 82/70.2

[58] Field of Search ................................ 82/1.11, 46, 47, 82/53, 59, 70.1, 70.2; 409/138

[56] References Cited

U.S. PATENT DOCUMENTS

| | | | |
|---|---|---|---|
| 3,125,914 | 3/1964 | Wasley | 82/47 |
| 3,646,840 | 3/1972 | Bozek | 82/47 |
| 3,839,933 | 10/1974 | Paramonoff | 82/61 |
| 3,878,743 | 4/1975 | Melind | 82/54 |
| 4,012,972 | 3/1977 | Rice | 82/70.2 |
| 4,014,228 | 3/1977 | Dean | 82/47 |
| 4,318,319 | 3/1982 | Scholin | 82/47 |
| 4,982,496 | 1/1991 | Gaither et al. | 82/1.11 |
| 5,564,321 | 10/1996 | Rath | 82/54 |
| 5,596,914 | 1/1997 | Liao | 82/70.2 |
| 5,840,224 | 11/1998 | Thary | 264/46.4 |

OTHER PUBLICATIONS

PVC Heat–Shrinkable Packing Film Advertisement, Hui Hung Plastic Mfg. Co., Ltd., 3 pages, internet address: "http://manufacture.com.tw/~huihung/", copyright 1998.

*Primary Examiner*—A. L. Wellington
*Assistant Examiner*—Erica Ergenbright
*Attorney, Agent, or Firm*—Dickstein Shapiro Morin & Oshinsky LLP

[57] ABSTRACT

A system is provided for trimming excess vinyl film from a hoop assembly. The hoop assembly may be used to manufacture semiconductor workpieces. The system uses a pressure applying member applied to the excess film with a bearing surface sufficient to receive such pressure on the opposite side of the excess film. The system may be rotated such that the film is trimmed around the entire hoop assembly at the position of the pressure applying member. The bearing surface may be part of the support for the system or incorporated into the hoops.

16 Claims, 3 Drawing Sheets

SYSTEM FOR TRIMMING EXCESS MATERIAL

BACKGROUND OF THE INVENTION

I. Field of the Invention

The present invention relates to an apparatus and method for trimming excess vinyl film from a semiconductor workpiece hoop assembly which supports one or more semiconductor workpieces during semiconductor fabrication and packaging.

II. Description of the Related Art

In the manufacture and assembly of semiconductor products, relatively small parts or components must be moved through several automated processes. Such parts or components are commonly placed on a hoop assembly having a vinyl film which is stretched across interlocking hoops. The hoop assembly is used as a carrier for the parts or components. Once workpieces are mounted on the vinyl film, manufacturing operations such as scribe/deave, facet coat, load/unload, pick and place, and visual inspection may be performed using automated equipment. The workpieces are mounted and dismounted from the hoop assembly at each step.

Each time a new hoop assembly is constructed, the excess vinyl that sticks out from the hoop joint, where the inner and outer hoops meet, must be trimmed. Such an example is depicted in FIG. 1, where the inner and outer hoops 114, 116 reside on top of support 102. The film 104 is stretched across the interior of the hoops 114, 116 and through the hoops 114, 116, which provide the necessary tension for the film 128 to remain in place. Excess film 118 extends outside of the inner and outer hoops 114, 116. This excess film 118 must be trimmed up to the edge of the hoop assembly 126. Ordinarily, an operator manually trims away the excess film 118 using a razor blade. However, a new blade must be used for every other hoop assembly 114, 116, 128 due to the dulling effects of the vinyl film. Moreover, this manual process is cumbersome and encompasses safety issues associated with the use of any blade or sharp edge instrument.

SUMMARY OF THE INVENTION

The present invention relates to a system for efficiently and safely trimming excess vinyl film from a new hoop assembly. According to one aspect of the invention, an unsharpened edge, which uses pressure to trim the film, is applied to the excess vinyl film and against a bearing surface, sufficient to withstand such pressure. By applying sufficient pressure the excess film will separate from the hoop assembly. Since the pressure applying member has an unsharpened edge, the wear and safety factors associated with a razor blade or other sharp edged instrument are avoided. In one embodiment, the bearing surface is a cylindrical insert residing above the hoop assembly.

According to another aspect of the invention, instead of using a bearing surface on a cylindrical insert, the outer hoop provides a bearing surface upon which the pressure applying member may interface to trim the excess vinyl film.

BRIEF DESCRIPTION OF THE DRAWINGS

The foregoing and other advantages and features of the invention will become more apparent from the detailed description of preferred embodiments of the invention given below with reference to the accompanying drawings in which:

FIG. 2(*b*) is a partial top view of the system of FIG. 2(*a*);

DETAILED DESCRIPTION OF PREFERRED EMBODIMENTS

Figure 1:
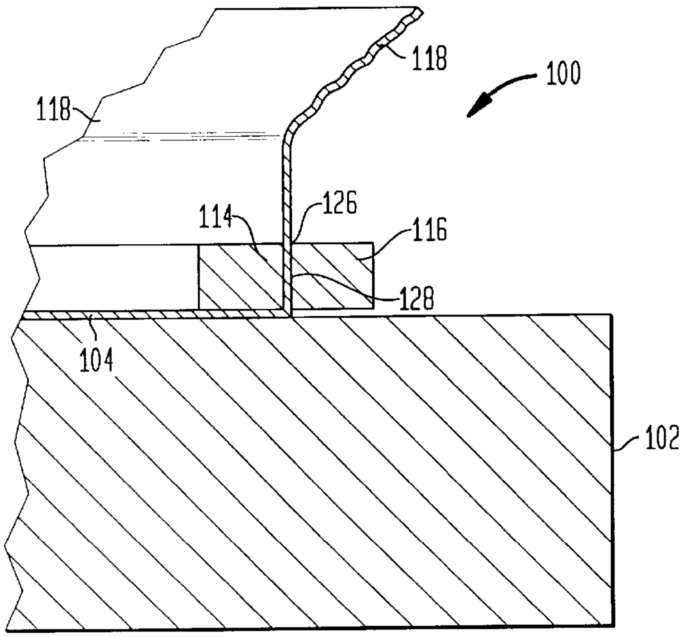
FIG. 1 is a partial cross sectional view of a hoop assembly prior to removal of the excess film.
Figure 2A:
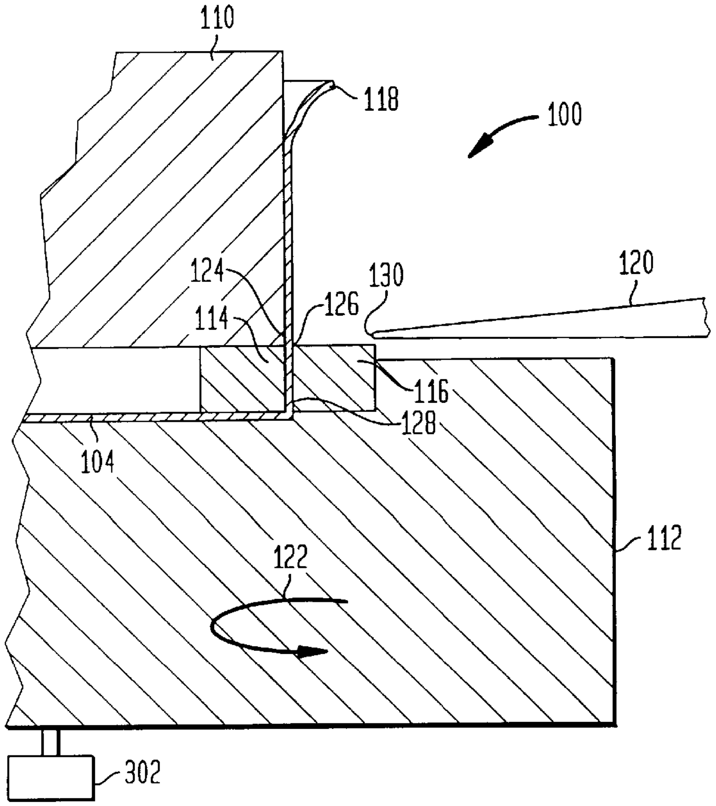
FIG. 2(*a*) is a partial cross sectional view of an excess film trimmer tool constructed in accordance with a preferred embodiment of the present invention.
Figure 2B:
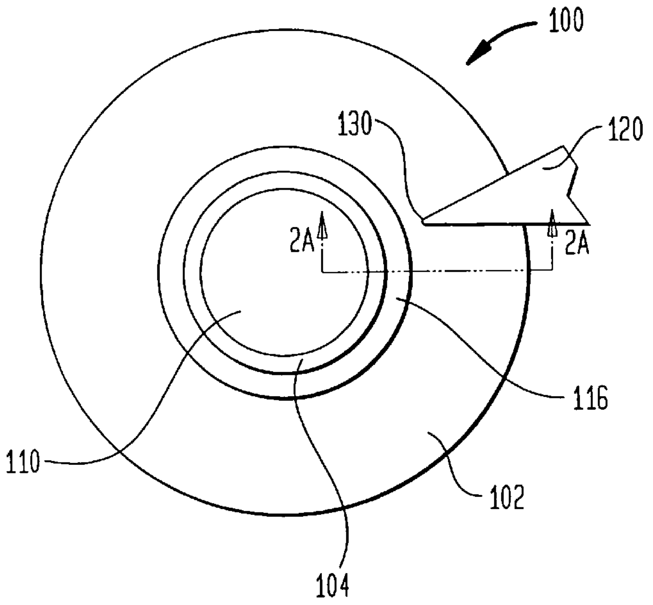

Referring now to the drawings, where like reference numerals designate like elements, there is shown in FIG. 2(*a*) a trimming system 100 for trimming the excess film from a semiconductor hoop assembly. The trimming system 100 includes an inner hoop 114, an outer hoop 116, film 128, a cylindrical base 112, a cylindrical insert 110 and a pressure applying member 120. The cylindrical base 112 supports the inner and outer hoops 114, 116 during the trimming process. The cylindrical insert 110 resides on top of the inner hoop 114. The cylindrical insert 110 provides a bearing surface 124 which is used to absorb the pressure from the pressure applying member 120 while allowing the pressure applying member 120 to trim the excess film 118.

In the FIG. 2(*a*) position, the inner and outer hoops 114, 116 are assembled with the film 128 in place and with the entire hoop assembly 114, 116, 128 turned upside down from the laser bar support position which will be used in manufacturing operations. The hoop assembly 114, 116, 128 is supported by the cylindrical base 112 which is rotatable during the trimming process in the direction of arrow 122 by means of a drive device 302 such as a motor. The cylindrical insert 110, which is also rotated in the same direction as the cylindrical base 112 by means of the same drive device 302, provides additional top support to the inner hoop 114. The pressure applying member 120 initially resides above the outer hoop 116 with the pressure edge 130 horizontally facing the cylindrical insert 110 at bearing surface 124 which is a bearing surface. FIG. 2(*b*) provides a top view of the trimming system 100 of FIG. 2(*a*), where the cylindrical aspects of this embodiment are illustrated. The cross sectional view of FIG. 2(*a*) is taken along line 2(*a*)—2(*a*) of FIG. 2(*b*).

Figure 3:
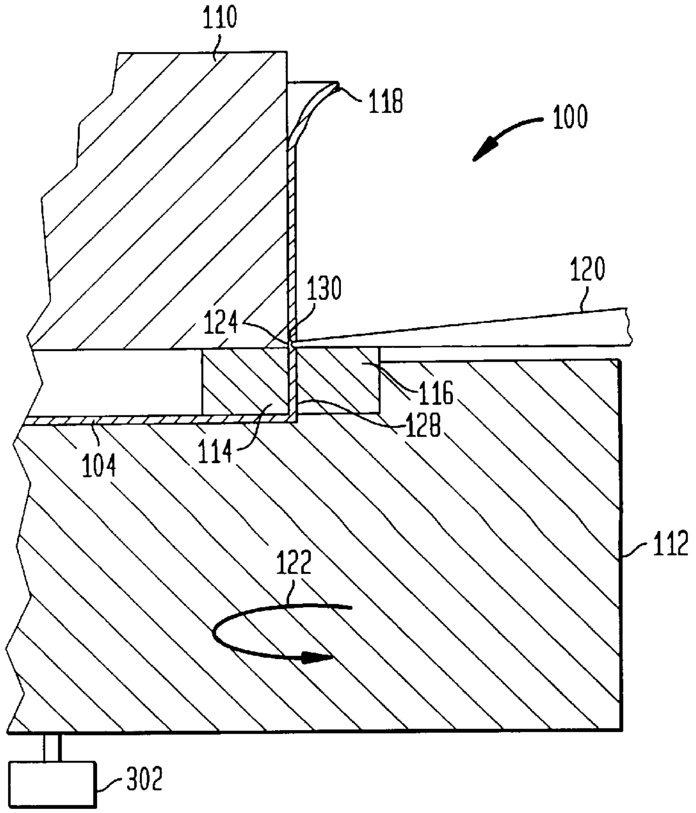
FIG. 3 is a partial cross sectional view of the system of FIG. 2(*a*), at a subsequent stage of operation.

In operation, as illustrated in FIG. 3, the pressure applying member 120 moves horizontally into contact with the excess film 118, applying pressure by the edge 130 at the bearing surface 124. The cylindrical base 112 then begins to rotate, which in turn rotates the hoop assembly 114, 116, 128 and cylindrical insert 110. In this embodiment, while the cylindrical base 112 rotates, the pressure applying member 120 remains stationary. In an alternative embodiment of the invention, the pressure applying member 120 may be rotated in the direction of arrow 122 while the cylindrical base 112, cylindrical insert 110 and hoop assembly 114, 116, 128 remain stationary. The cylindrical base 112 and cylindrical insert 110 support the hoop assembly 114, 116, 128 such that the hoop assembly 114, 116, 128 only moves if the cylindrical base 112 moves.

With the pressure applying member 120 applying sufficient pressure to trim the excess film 118, the excess film 118 is trimmed around the entire hoop assembly 114, 116, 128 at bearing surface 124 as the cylindrical base 112 and cylindrical insert 110 rotate the hoop assembly 114, 116, 128.

When completed, the excess film 118 has been trimmed without the use of a sharp blade and in an automated manner which can be predictably replicated.

Figure 4:
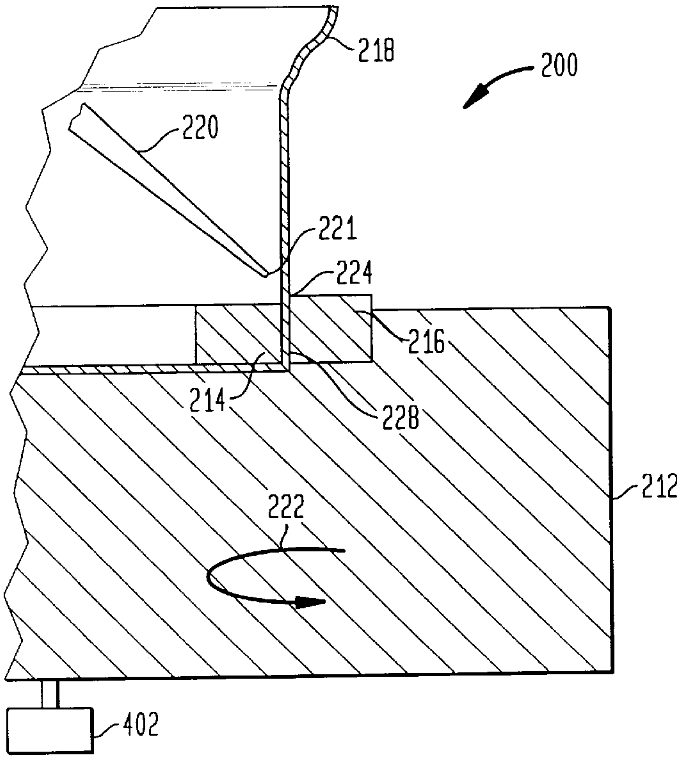
FIG. 4 is a partial cross sectional view of an excess film trimmer tool constructed in accordance with another preferred embodiment of the invention.

In another embodiment of the invention, shown in FIG. 4, a trimmer 200 includes an inner hoop 214, an outer hoop 216, film 228, a cylindrical base 212 and a pressure applying member 220. The cylindrical base 212 provides support for the hoop assembly 214, 216, 228 as in the first embodiment. However, instead of using a cylindrical insert 110, the FIG. 4 embodiment has an outer hoop 216 which extends axially beyond the inner hoop 214. A lip 224 is formed by the outer hoop 216 extending axially beyond the inner hoop 214. The lip area 224 may be used as a bearing surface upon which the pressure edge 221 applies pressure to trim the excess film 218. The bearing strength of the outer hoop 216 is sufficient to serve as a bearing edge for the pressure applying member 220.

Figure 5:
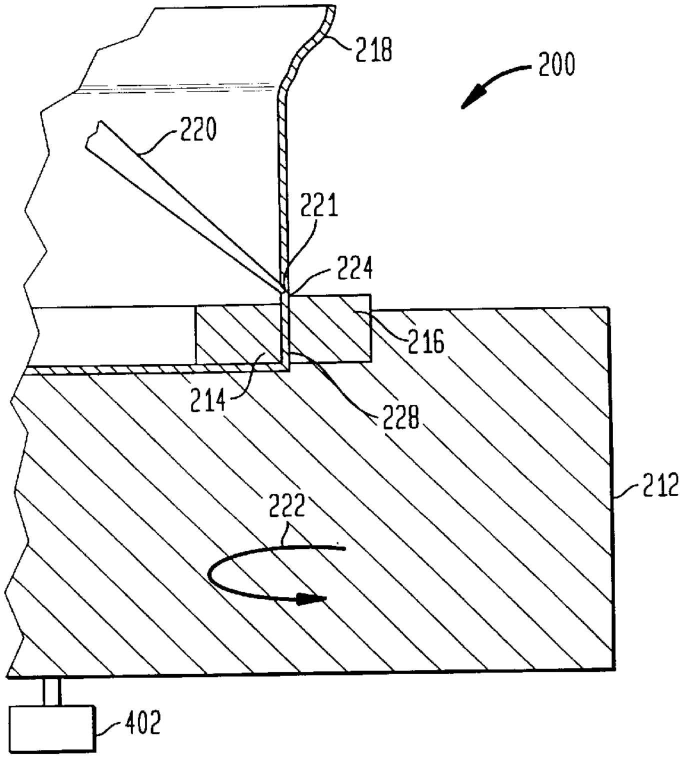
FIG. 5 is a partial cross sectional view of the system of FIG. 4, at a subsequent stage of operation.

In operation, as seen in FIG. 5, the pressure applying member 220 is brought in on an angle passing the inner hoop 214 and applies pressure with edge 221 to the excess film 218 at the lip 224. Thereafter, the cylindrical base 212 is rotated by a drive device 402 in the direction of arrow 222, which in turn rotates the hoop assembly 214,216,228. The pressure applying member 220 remains stationary while the hoop assembly rotates 214, 216, and 228. Alternatively, the pressure applying member 220 may rotate while the hoop assembly 214,216, 228 and cylindrical base 212 are stationary.

The embodiment shown in FIGS. 4 and 5 has the added feature that a cylindrical insert 110 is not needed. The FIGS. 4 and 5 embodiment provides a dean, close removal of the film excess. This is particularly useful when trimming away the very small excess film left when a hoop assembly is expanded to stretch the vinyl film and provide a space between bars or chips that have been cleaved. The space between cleaved parts may be needed so that the bars/chips can be dismounted from the vinyl film thought damaging neighboring parts.

The present invention provides for an apparatus and method to trim excess film from a hoop assembly using an unsharpened edge which eliminates concerns normally associated with sharp cutting implements.

While certain embodiments of the invention have been described and illustrated above, the invention is not limited to these specific embodiments as numerous modifications, changes and substitutions of equivalent elements can be made without departing form the spirit and scope of the invention. Accordingly, the scope of the present invention is not to be considered as limited by the specifics of the particular structures which have been described and illustrated, but is only limited by the scope of the appended claims.

What is claimed as new and desired to be protected by Letters Patent of the United States is:

1. An apparatus for trimming excess material from an assembly for handling semiconductor devices, said apparatus comprising:

a support member adapted to support said assembly;

a bearing surface for supporting one side of said excess material, said bearing surface residing on an outer hoop of said assembly; and a pressure applying member adapted to engage with and apply pressure to another side of said excess material, at least one of said pressure applying member and said support member being movable relative to the other.

2. The apparatus according to claim 1, wherein said support member is cylindrical.

3. The apparatus according to claim 2, further comprising a device for rotating said support member.

4. The apparatus according to claim 3, wherein said support member is rotated by said device for rotating said support member while said pressure applying member remains stationary.

5. The apparatus according to claim 1, further comprising a drive device for rotating said pressure applying member while said support member remains stationary.

6. The apparatus according to claim 1, wherein said assembly includes at least one hoop supporting a material.

7. The apparatus according to claim 1, wherein said assembly includes an outer hoop and an inner hoop, and wherein material is secured between said outer and inner hoops.

8. The apparatus according to claim 7, wherein said outer hoop extends axially beyond said inner hoop.

9. The apparatus according to claim 1, wherein said pressure applying member includes an unsharpened edge.

10. The apparatus according to claim 9, wherein said bearing surface and said edge reside within the same plane.

11. The apparatus according to claim 1, wherein said excess material includes vinyl film.

12. A system for trimming excess material, said system comprising:

a hoop assembly for supporting semiconductor products;

a support for said hoop assembly, and wherein said hoop assembly is located on said support;

a bearing surface for supporting one side of said excess material, said bearing surface residing on an outer hoop of said hoop assembly;

a pressure applying member adjacent to said hoop assembly for applying pressure to said excess material; and a drive device for moving at least one of said pressure applying member and said support relative to the other.

13. A method of trimming excess material from a hoop assembly, said method comprising the steps of:

loading a flexible film in said hoop assembly; and using an unsharpened edge pressure applying member against a bearing surface of an outer hoop of said hoop assembly to apply pressure to an excess portion of said flexible film.

14. The method of claim 13, further comprising the step of placing an insert on said hoop assembly.

15. The method of claim 13, further comprising the step of rotating said hoop assembly.

16. A method of making a support for semiconductor products, said method comprising the steps of:

loading a hoop assembly onto a support member;

moving an unsharpened pressure applying member against a bearing surface of an outer hoop of said hoop assembly; and using said pressure applying member to trim excess material from said hoop assembly.

* * * * *